United States Patent
Denmon

(10) Patent No.: US 11,716,988 B2
(45) Date of Patent: Aug. 8, 2023

(54) FEEDING DUCK APPARATUS

(71) Applicant: Huntwise, Inc., Monroe, LA (US)

(72) Inventor: Terry Denmon, Monroe, LA (US)

(73) Assignee: HUNTWISE, INC., Monroe, LA (US)

( * ) Notice: Subject to any disclaimer, the term of this patent is extended or adjusted under 35 U.S.C. 154(b) by 205 days.

(21) Appl. No.: 16/718,318

(22) Filed: Dec. 18, 2019

(65) Prior Publication Data

US 2021/0186003 A1    Jun. 24, 2021

(51) Int. Cl.
*A01M 31/06* (2006.01)

(52) U.S. Cl.
CPC .................................. *A01M 31/06* (2013.01)

(58) Field of Classification Search
CPC ..................................................... A01M 31/06
USPC ........................................................... 43/2, 3
See application file for complete search history.

(56) References Cited

U.S. PATENT DOCUMENTS

| | | | | |
|---|---|---|---|---|
| 2,434,335 A * | 1/1948 | Signalness | ............ | A01M 31/06 43/3 |
| 2,591,554 A * | 4/1952 | Kinney | ................. | A01M 31/06 43/3 |
| 2,849,823 A * | 9/1958 | Miller | .................. | A01M 31/06 43/3 |
| 3,434,234 A * | 3/1969 | Schleter | ................. | A63H 23/10 446/158 |
| 5,377,439 A * | 1/1995 | Roos | ..................... | A01M 31/06 43/3 |
| 6,088,944 A * | 7/2000 | Jones | .................... | A01M 31/06 446/155 |
| 6,412,209 B1* | 7/2002 | Kapraly | ............... | A01M 31/06 43/3 |
| 6,412,210 B1* | 7/2002 | Horrell | ................. | A01M 31/06 446/155 |
| 11,083,189 B1* | 8/2021 | Baskfield | ............. | A01M 31/06 |
| 2002/0178639 A1* | 12/2002 | Daniels | ................. | A01M 31/06 43/3 |
| 2004/0010957 A1* | 1/2004 | Corbiere, Jr. | ......... | A01M 31/06 43/3 |
| 2012/0090217 A1* | 4/2012 | Young | .................. | A01M 31/06 43/3 |
| 2014/0259860 A1* | 9/2014 | Baskfield | ............. | A01M 31/06 43/3 |
| 2017/0049095 A1* | 2/2017 | Hanson | ................. | A01M 31/06 |

* cited by examiner

*Primary Examiner* — Son T Nguyen
*Assistant Examiner* — Hae Rie Jessica Byun
(74) *Attorney, Agent, or Firm* — Kean Miller, LLP; Robert Devin Ricci; Lauren Rucinski

(57) ABSTRACT

Disclosed herein is a decoy apparatus comprising: a body (or structure) shaped to resemble at least a portion of an animal resting on water and a weighted member operationally attached to a motor such that the weight can be redistributed so cause the decoy apparatus to move to a feeding position in which a portion of the decoy body, preferable the head portion, is tipped under the waterline and the opposing portion is raised in the air.

9 Claims, 1 Drawing Sheet

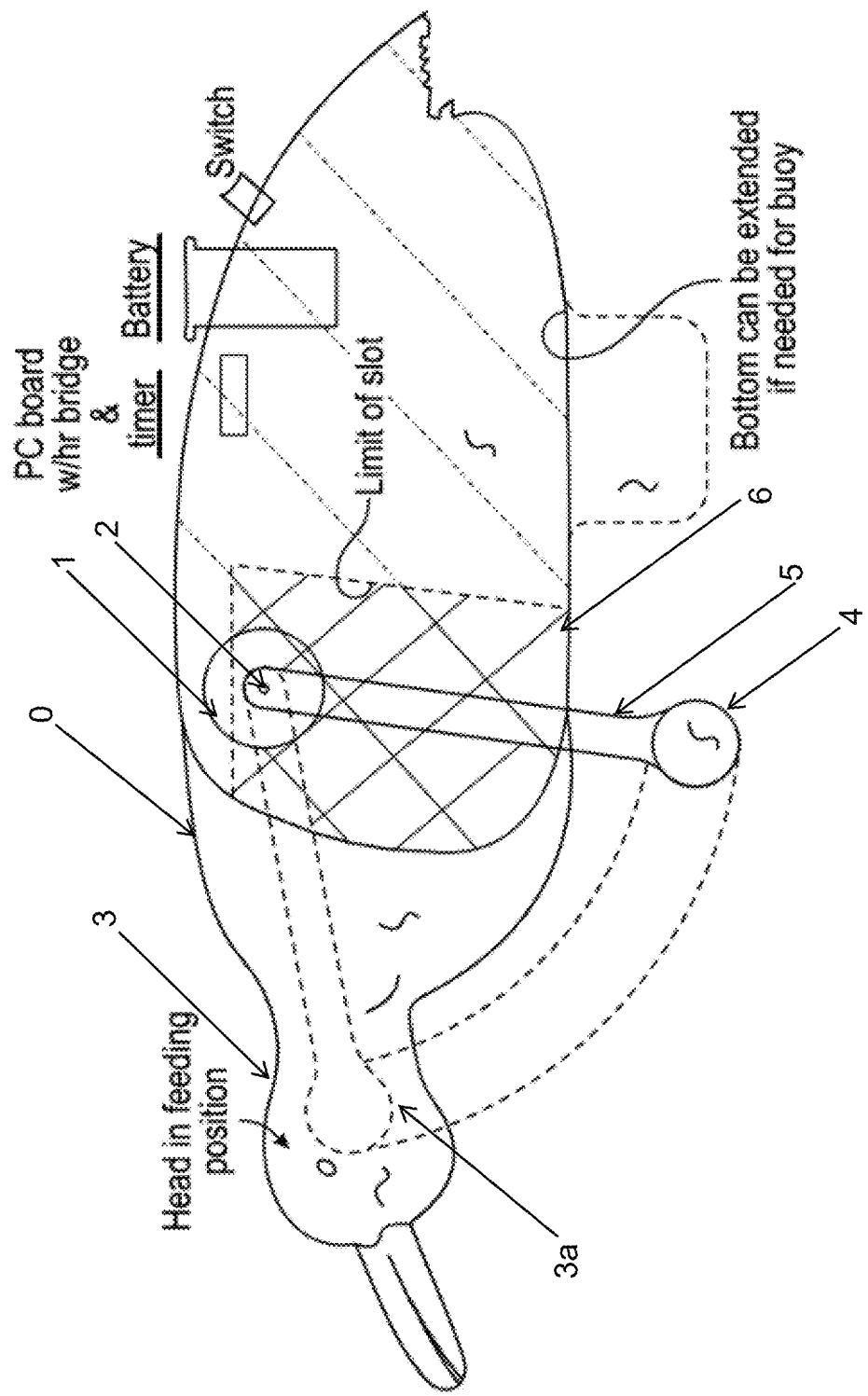

FEEDING DUCK APPARATUS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

FIG. 1 is a hand drawing showing a cross sectional view of an embodiment of the feeding duck apparatus.

BACKGROUND OF THE INVENTION

Outdoor enthusiasts, recreational hunters, and photographers have long recognized that live animals and game, and particularly live waterfowl, are attracted to areas that appear to be inhabited by similar animals. For this reason, hunters have used decoys to attract live game to within shooting distance of a hunter's rifle, shotgun or other weapon, and within prime viewing distance of photographers and other outdoor enthusiasts.

In order to be effective, a decoy must resemble the animal. In theory, the more life-like a decoy will look, the more likely that the intended animal will be fooled by the decoy into behaving as intended. For example, numerous hunters place duck decoys at or near the surface of the water to signal to other ducks to approach the area. A large industry has formed around the creation and selling of these types of decoys.

Traditional decoys are motionless molds resembling at least a portion of an animal. Typically, these decoys comprise partially buoyant structures shaped into the look of a body and head of an animal, such as a waterfowl. Although the decoys may have resembled an animal, their rigid nature limited their functionality. To overcome this limitation, technology was employed to make the decoys more life-like by adding motion. Perhaps the most prevalent motion decoy is a spinning wing decoy designed to give the appearance of a waterfowl flapping its wings. When placed near the water, the decoy gives the illusion that a waterfowl is landing in an area, giving the look that the area is safe for ducks to land. While these decoys have enjoyed and continue to enjoy great success, room remains for further innovation to supplement or even replace traditional stationary and motion decoys.

A decoy device is provided herein which aims to mimic the natural appearance of an animal feeding in water through a simple and user friendly mechanism, thereby rending the device more efficient, less costly to manufacture, and more robust against breakage. As described herein, the device uses the torque caused by the movement of a counterbalance weight operationally connected to a motor and decoy body to move the decoy body from a resting position to a feeding position. The device comprises, generally, a motorized, floating body in the shape of a duck or other water living bird, animal or amphibian, a weight member operationally attached to a mechanical drive (a motor), the drive itself connected to the decoy body, wherein the motor is adapted to move the weight. When resting, the decoy body is substantially horizontal to the water line and the weight is disposed into the water at a substantially 90 degree angle to the body. When powered, the motor controllably manipulates a drive shaft connected to the counter-balance weight via an arm member. The torque created by the motor acting on the weight, along with gravity acting on the weight, causes the decoy body to rotate towards the weight, causing a portion of the decoy body to submerge below the waterline and an opposing portion to raise above the waterline. This mimics the feeding position of the animal. When de-energized, the body will separate from the weight and return towards the resting position, thereby completing the cycle of feeding birds in the water.

SUMMARY

Disclosed herein is a decoy apparatus comprising: a body (or structure) shaped to resemble at least a portion of an animal, a motor housed within the body, a weight member and a motor, wherein the weight member is operationally attached to the motor.

In a preferred embodiment, the weight is counter-balanced, and more preferably, a weighted arm.

The motor manipulates the position of the weight with respect to the body to change the center of mass of the decoy apparatus when acted upon. In one or more embodiments, the weight is operationally attached to the motor such that it can move between 0 and 120 degrees along an angle of rotation with respect to the body's resting position. In a preferred embodiment, the weight can rotate between 0-90 degrees with respect to the resting position.

In alternate embodiments, the body may be monolithic with, or separate from the head member and neck member. In alternate embodiments, there is no head member, and the weight moves to and from a shoulder or bust portion of the body.

In one or more embodiments, the center of mass shifts in the decoy apparatus when the weight is acted upon by the motor, causing the decoy to tilt forward to an active or "feeding position" in which the decoy head and/or front of the body is substantially under water and the body is tilted such that the aft or tail section raises up while the bow section tips under water.

In one or more embodiments, the decoy body may be less buoyant in the bow section than the middle section, the aft section, or both.

In alternate embodiments, the decoy body may be substantially hollow in the bow section and may further comprise a hollow slot or cavity into which the weight can rotate when acted upon by the motor. In such an embodiment, the weight pulls the decoy body into the water, causing the decoy to tip forward to a near vertical position.

In alternate embodiments, the decoy body may comprise an extension section near the aft. This extension may be a part of the decoy body and may either assist in the buoyancy necessary to offset the head member and/or cover a portion of the body when the tail/aft section is raised when the decoy is in the feeding position.

In one or more embodiments, the motor may be a DC motor. In alternate embodiments, the motor is between 6-12 volt DC motor, preferably a 4.5-6 volt DC motor with adequate torque to rotate a weight attached to an extension arm.

In alternate embodiments, the weight may be between 1-10 ounces, preferably between 4-8 ounces and more preferably 6 ounces, and is attached to an extension arm between 1-12 inches in length, preferably between 4-10 inches and more preferably around 8 inches in length. In a preferred embodiment the extension arm is attached directly to the motor shaft.

The motor is preferably selected to operate at least 4 hours on a single charge of battery(ies) or a (set of) non-chargeable battery(ies), and more preferably between at least 6-8 hours.

The motor may be able to hold the weight between two positions, i.e., the resting position and the feeding position. The motor may be a gear motor. In a preferred embodiment, the motor is a direct motor capable of free spinning backwards from the activated position. In such an embodiment, the motor may return to its non-activated state when the motor ceases to act upon the arm and weight mechanism, In a preferred embodiment, the motor may allow holding both positions 1 & 2, on the ends for a period of time—e.g., between 1 and 60 seconds. In such an embodiment the motor may be suitable to either bog down on the ends when energized, or of a type that at least will not free spin backwards when de-energized such that is can remain in that position for up to 5 seconds. At the end of that 5 second period, the motor will reverse direction either by free spinning or reversing the rotation of the motor to allow the weight & arm to return to the previous position.

The motor maybe controlled by a timer in one or more embodiments. In a preferred embodiment, the motor may be connected to a PC board (and, in some embodiments, with an H-bridge or an IC-chip) and a timer that is programmed to energize and de-energize the motor at intervals. The timer may be pre-determined, adjustable, or may provide a random timer component. The timer may be mounted on the PC board.

In alternate embodiments, the motor may be controlled via a remote, which can either set or apply the timer, or allow the user to manually activate and deactivate the motor. In an embodiment, an on-off switch is operationally connected to the motor and/or power supply to preserve the power supply when not in use. Preferably, the switch is located so as to be accessible from the outside of the body shell.

Depending on the motor and weight configuration, the default position may either be the feeding position or the position where the body is substantially horizontal with the waterline.

In one or more embodiments, the motor actively manipulates the weight in one direction and the weight returns to the other direction without the motor, such as by gravity or displacement. In alternate embodiments, the motor may actively manipulate in both rotational directions.

The decoy body may be partially buoyant to float in a substantially horizontal position when resting, i.e., when the weight is not acted upon by the motor. In one or more embodiments, the weight will be substantially perpendicular to and in a downwardly perpendicular position with respect to the body when the body is in the resting position. In one or more embodiments, the decoy body may be partially filled with foam or other materials to assist with the buoyancy.

In alternate embodiments, the decoy body may be a hard molded body of plastic, or a flexible body of pvc or other flexible material, into which the housing containing the mechanical/electrical devices is mounted. Portions of the body may be filled with a foam material with a slot or slots or openings as needed to accommodate the housing and to allow the weight to move in the designed configuration.

Foam material can be located and configured so as to achieve the necessary buoyancy and to facilitate the tipping of the decoy. In one or more embodiments, it may be advantageous for the buoyancy to be primarily located toward the back of the decoy and the head and neck remain open on the bottom to allow the weight to enter a cavity. It may also be advantageous to limit or completely eliminate buoyancy on the front/bow end to further facilitate tipping into the feeding position.

In alternate embodiments, the decoy is in the shape of a waterfowl or other water living bird, animal or amphibian, and preferably is in the shape of a duck or goose.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of components similar to the ones described in this document, in conjunction with other present or future technologies. The described features, structures, or characteristics may be combined in any suitable manner in one or more embodiments. In the following description, numerous specific details are provided, such as examples of angles, weights, motors, and application times. One skilled in the relevant art will recognize, however, that the disclosed Decoy Apparatus may be practiced without one or more of the specific details, or with other methods, components, materials, and so forth. In other instances, well-known structures, materials, or operations are not shown or described in detail to avoid obscuring aspects of the invention.

For illustrative purposes, a decoy apparatus is described herein comprising, in general, a body 0 in the shape of an avian animal, particularly a duck. More particularly, the illustrative example comprises the general shape of a waterfowl's body 0, a motor 1 mounted to and residing within the body 0, said motor comprising a drive shaft 2, and a head and neck member 3, and a weighted component 4 connected to the drive shaft 2 via extender arm 5.

Turning to FIG. 1, a schematic drawing of an embodiment of the decoy apparatus is shown. As drawn, the decoy is shown in the resting position, in which the head and neck member 3 is positioned substantially horizontal to the body 0. As shown, the depicted head member is a fixed appendage of the decoy body. The head member comprises an upper shell defining a lower cavity 3a exposed towards the bottom of the head and neck member. The cavity 3a is shaped so as to house the weight and extender arm when the decoy is in the resting position. The apparatus further comprises another slot 6 in the bow or front portion of the decoy body into which the weight 4 can maneuver. It is understood that the bow portion may be substantially hollow so as to minimally contribute to the decoy's overall buoyancy.

A graph is depicted to help illustrate potential angles of motion. As depicted, the angle of orientation is substantially parallel with the water line when the decoy is in the resting position. The resting position may find the head member at an angle from true horizontal, such as between 90-210 degrees. It is key that the position and load of the weight is offset by the buoyancy of the body to maintain the body in a substantially horizontal position to the waterline when the decoy is in the resting position.

In operation, the decoy will generally rest in the horizontal default or resting position when not activated. This position will generally have the weight extending downwardly substantially vertically from the body deeper into the water. This gives the visual appearance of a duck resting on the water similar to traditional stationary decoys. In such a position, the weight may act in part as a keel. A primary advantage of the instant decoy apparatus is its ability to move from the traditional resting position into a feeding position, thereby providing more life-like attributes. In nature, many ducks dip their heads and front sections (shoulder and/or bust area) underwater to obtain food, causing its tail to elevate and stick out of the water. Then, the duck returns to a resting position on the water's surface to finish eating the food and/or breathe before diving again. The instant embodiment mimics this position by operationally moving of the weight mechanism by the motor 1 between two positions, thereby shifting the balance of the decoy.

The depicted motor is a DC motor connected by the housing body and is operationally paired to the weight via the extender arm and the motor's drive shaft. The motor is powered by a power source, e.g., a battery, and controlled by an onboard pc board with an h-bridge and timer chip. The timer may be set to set intervals, e.g., 2-20 seconds, or may be set to randomly activate the motor.

The device is configured such that the timer will selectively power the motor, causing the drive shaft 2 to rotate the extender arm and the weight into the cavity 3*a* of the head and neck member to shift the previously centered weight toward the head or aft section of the decoy. As shown, the body comprises slot 6 to allow the weight to swing. In the depicted embodiment, the motor will rotate the weight 4 and body 0 relative to each other such that the weight will be at least partially housed within the head cavity 3*a*. This motion redistributes the weight of the decoy, causing the decoy to reposition in the water. The resulting position, i.e., the feeding position, will dunk the decoy's head member under the waterline and elevate the tail or aft section of the body above the waterline. Depending on the embodiment and conditions, the tail may be raised at an angle between 20-120 degrees, preferably between 45-90 degrees, and more preferably substantially at 90 degrees.

The timer will continue to power the motor for a pre-set amount of time to maintain the body in the feeding position. When the desired time has lapsed, the timer will de-energize the motor, allowing the weight to move back to its original position spatially separated from the head member. and redistribute the buoyancy of the decoy. In alternate embodiments, the motor may actively raise and lower the weight in each direction to manipulate the movement of the decoy. The decoy body will remain in the resting position until the appropriate period of time set, at which time the cycle will repeat.

For the purpose of understanding the Feeding Duck Decoy, references are made in the text to exemplary embodiments of a decoy, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

The invention claimed is:

1. A decoy apparatus operationally configured to move from a resting position to a feeding position comprising:
   a. a partially buoyant decoy body shaped to resemble at least a portion of a waterfowl, said decoy body having a tail end and a front end opposite the tail end;
   b. a head member connected to said decoy body on the front end of the decoy body;
   c. a motor comprising a drive shaft, said motor housed within and securely attached to said body and being connected to an onboard power supply;
   d. a counter-balanced weight; and
   e. an extension arm, having a weight-end and a drive shaft-end opposite the weight-end, wherein the weight is disposed on the weight-end of the extension arm and the drive shaft-end of the extension arm is connected to the drive shaft;
   wherein, when the decoy is placed in a body of water it comprises a water line corresponding with the water's surface, and when the decoy is in the resting position, the decoy body is substantially horizontal to the water line and the weight is substantially perpendicular to the body, extending downwards into the water; and wherein during operation, the power supply charges the motor to move the weight towards the head member such that at least a portion of the weight will traverse into said head member, thereby causing the head member to dip below the waterline and lift the tail end above the waterline.

2. The decoy apparatus of claim 1 wherein when the motor moves the weight towards the head member, the tail end lifts above the waterline at an angle between 20 to 120 degrees in relation to the waterline.

3. The decoy apparatus of claim 1 further comprising a timer that controls when the power supply charges the motor.

4. The decoy apparatus of claim 3 wherein said timer is pre-set so that the head member is held below the waterline for a period of time and when the period of time lapses, the motor is de-charged and the weight is moved back to substantially perpendicular by the motor.

5. The decoy apparatus of claim 1 wherein after the head member dips below the waterline, the power supply de-charges the motor and the weight is moved back to substantially perpendicular by gravity.

6. The decoy apparatus of claim 1 wherein after the head member dips below the waterline, the power supply charges the motor to move the weight back to substantially perpendicular.

7. The decoy apparatus of claim 1 wherein the decoy body comprises a buoyant material.

8. The decoy apparatus of claim 1 wherein the decoy body is less buoyant in the front end than the tail end.

9. The decoy apparatus of claim 1 wherein the motor moves the weight and the head member towards each other.

* * * * *